United States Patent
Kao (10) Patent No.: US 6,733,167 B1
(45) Date of Patent: May 11, 2004

(54) COAXIAL LIGHT EMITTER FOR OPTICAL FIBRE TREE

(75) Inventor: Cheung Chong Kao, Chai Wan (HK)

(73) Assignee: Boto (Licenses) Limited, Douglas (GB)

( * ) Notice: Subject to any disclaimer, the term of this patent is extended or adjusted under 35 U.S.C. 154(b) by 0 days.

(21) Appl. No.: 10/165,270

(22) Filed: Jun. 10, 2002

(51) Int. Cl.$^7$ ................................................. F21V 8/00
(52) U.S. Cl. ....................... 362/567; 362/123; 362/568
(58) Field of Search ................................ 362/567, 568, 362/565, 554, 583, 122, 123, 563, 564, 805, 806

(56) References Cited

U.S. PATENT DOCUMENTS

| | | | |
|---|---|---|---|
| 3,766,376 A | * 10/1973 | Sadacca | ...................... 362/567 |
| 4,777,571 A | * 10/1988 | Morgan | ....................... 362/123 |
| 5,702,170 A | * 12/1997 | Broderick | .................... 362/123 |
| 6,017,142 A | * 1/2000 | Harris, Jr. | .................... 362/564 |

* cited by examiner

Primary Examiner—Sandra O'Shea
Assistant Examiner—Bao Q. Truong
(74) Attorney, Agent, or Firm—Camille L. Urban; G. Brian Pingel (57) ABSTRACT

A coaxial light emitter a fibre optic lighted artificial tree of the present invention serves as a trunk for the tree and includes two spaced apart light sources that individually provide light to fibre optic bundles for a portion of the tree so that the tree can be separated into parts for the purposes of packaging or storage.

10 Claims, 8 Drawing Sheets

COAXIAL LIGHT EMITTER FOR OPTICAL FIBRE TREE

BACKGROUND OF THE INVENTION

1. Field of the Invention

The present invention relates in general to lighted artificial trees and more specifically to artificial trees that are lighted by a fibre optic light source.

2. Description of the Prior Art

Lighted artificial trees such as Christmas trees have been known in the art for many years. With the advent of fibre optic bundles, artificial trees have been lighted in the past by use of a single bundle of optic fibres illuminated by a single lamp. Color provided to the optical fibres was changed by rotating a transparent color disk between the end of the optical fibre bundles and the lamp.

Due to the limited illuminating range of the single lamp the number of optical fibre bundles incorporated in such structure was restricted, thus limiting the size of the Christmas tree employing such construction. Additionally, there has been no satisfactory method of efficiently lighting all of the fibres of trees that can be divided in parts in order to reduce their package sizes. This is because light is inevitably lost at the junctions of each divided section and, therefore, cannot propagate efficiently from a light source at the bottom of the tree all the way to the treetop. Thus, overall brightness of the optical fibres was reduced significantly on the upper portions of the trees.

The present invention is designed to provide a fibre optic lighted artificial tree that can be divided into lower and upper sections and yet still have the ability of having all of the optical fibres of the tree fully illuminated when assembled. The improved lighting provided by the present invention is accomplished by the use of a separate light source for each portion of the tree, with each source employing only one lamp. Consequently, the present invention facilitates the manufacture of taller and fuller optical fibre lighted artificial Christmas trees, but does so in a manner so that the trees can be readily manufactured with a minimum of expense and the trees can be packaged in relatively small containers.

SUMMARY OF THE INVENTION

The present invention provides a coaxial light emitter that serves as the trunk for a fibre optic lighted artificial tree that is formed in two separable sections, each individually lighted by separate light sources to permit the tree to essentially be separated into two portions to reduce the size of the packaging in which they can be sold or stored. The light emitter serves as the main trunk portion for the tree and incorporates two separate fibre optic light sources so that the tree can easily and readily be divided into two portions to present a reduced size for packaging.

In a preferred embodiment the coaxial light emitter has a lower portion comprised of a tree stand with a fibre optic light source, a first tree stabilizing member and a first trunk section that is supported by the stabilizing member and acts to provide a support for tree branches and optical fibres that form the lower portion of the tree. The light emitter further includes an upper portion that is comprised of an individual light source that is separate and distinct from the light source of the stand, a second tree stabilizer member that is mounted on the top portion of the second light source for supporting a second trunk section that extends upwardly therefrom and serves as a support for securing branches and fibre optic strands to the upper portion of the tree and also serves as a support for the top of the tree.

Thus, it is an object of the present invention to provide illumination of an artificial tree by fibre optic strands in such fashion that the tree is not significantly limited in size or fullness due to the limitation of the light provided to the fibre optic strands throughout the tree. Still further objects and advantages of the present invention will be apparent to those of ordinary skill in the art having reference to the following specification and the drawings which are described below.

DETAILED DESCRIPTION OF THE PREFERRED EMBODIMENT

Figure 1:
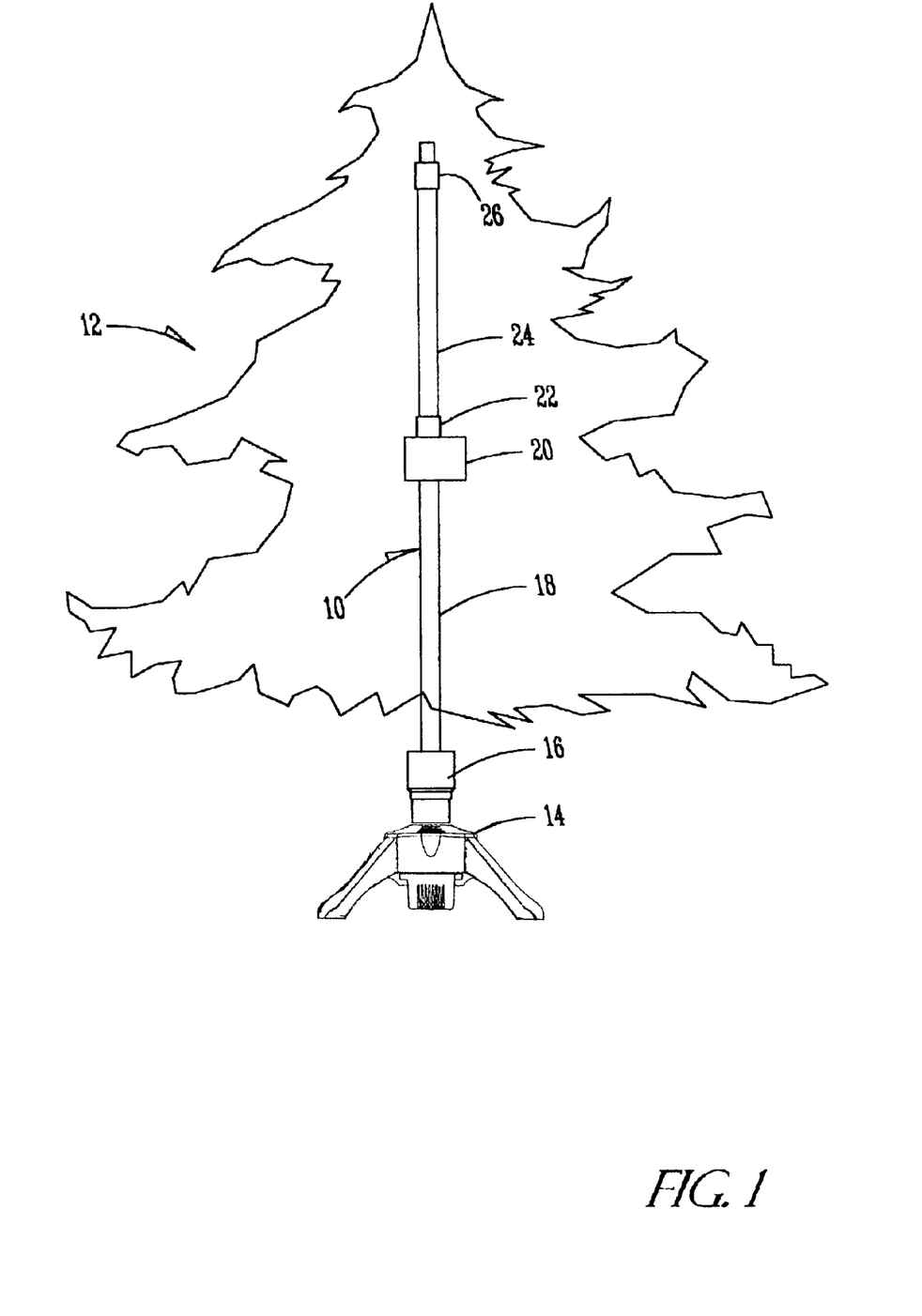
FIG. 1 is a reduced diagrammatic view of a decorative artificial tree incorporating a preferred embodiment of a coaxial light emitter of the present invention.

Turning now to the drawings and with reference first to FIG. 1, a preferred embodiment of a coaxial light emitter 10 of the present invention is shown in association with an artificial Christmas type tree 12. The tree 12 is designed to provide an attractive alternative to the use of a natural Christmas tree as it can be assembled and lighted in simply a matter of minutes.

Figure 2:
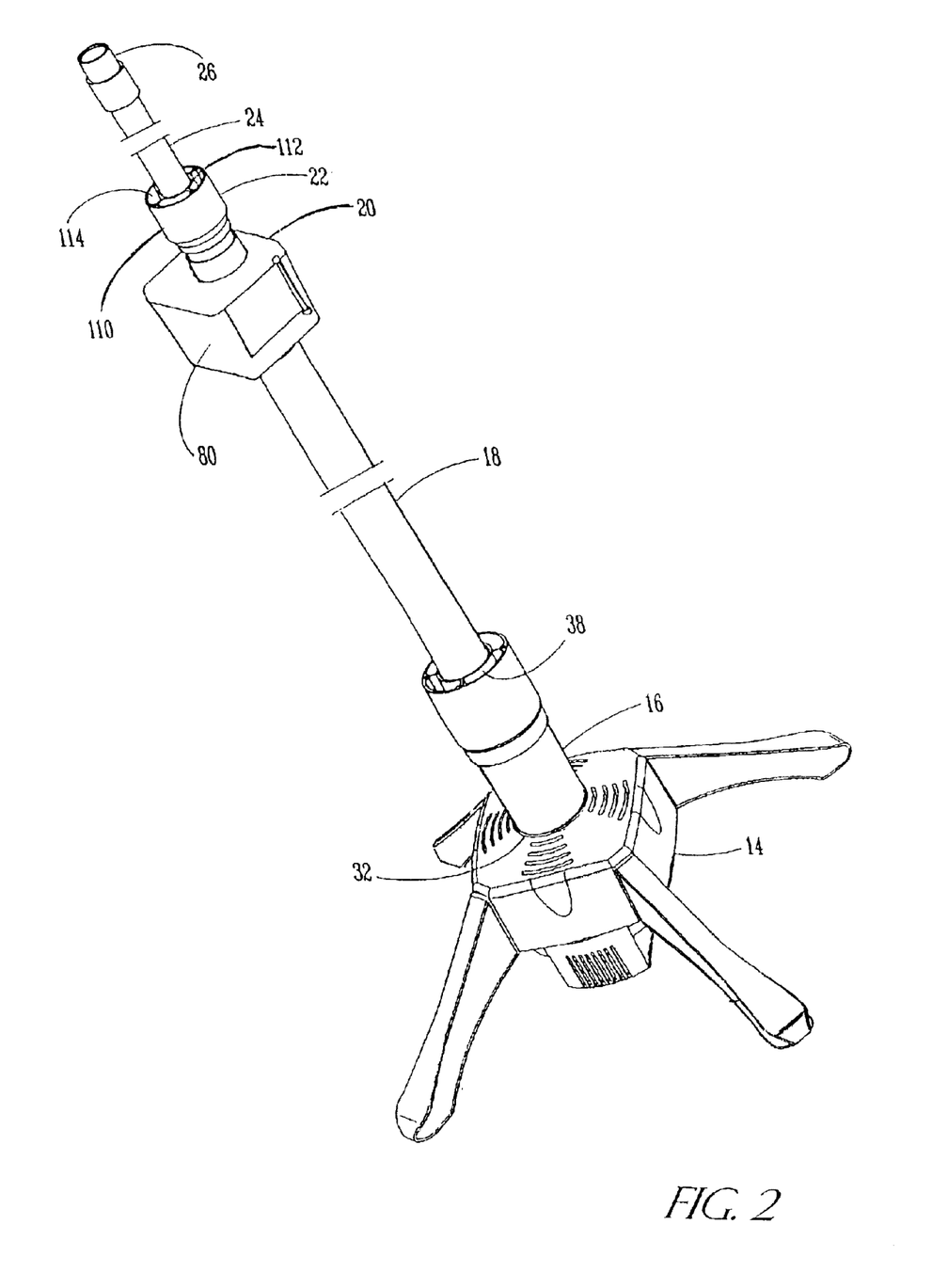
FIG. 2 is a reduced perspective view of the preferred embodiment of the coaxial light emitter of the present invention shown in FIG. 1.

Referring now to both FIGS. 1 and 2, the principal components of the light emitter 10 include a stand assembly 14, a first tree stabilizer member 16, a first trunk section 18, an intermediate light source assembly 20, a second trunk stabilizing member 22, a second trunk section 24 and a sleeve member 26 that is disposed on the upper end of the trunk section 24.

Figure 3:
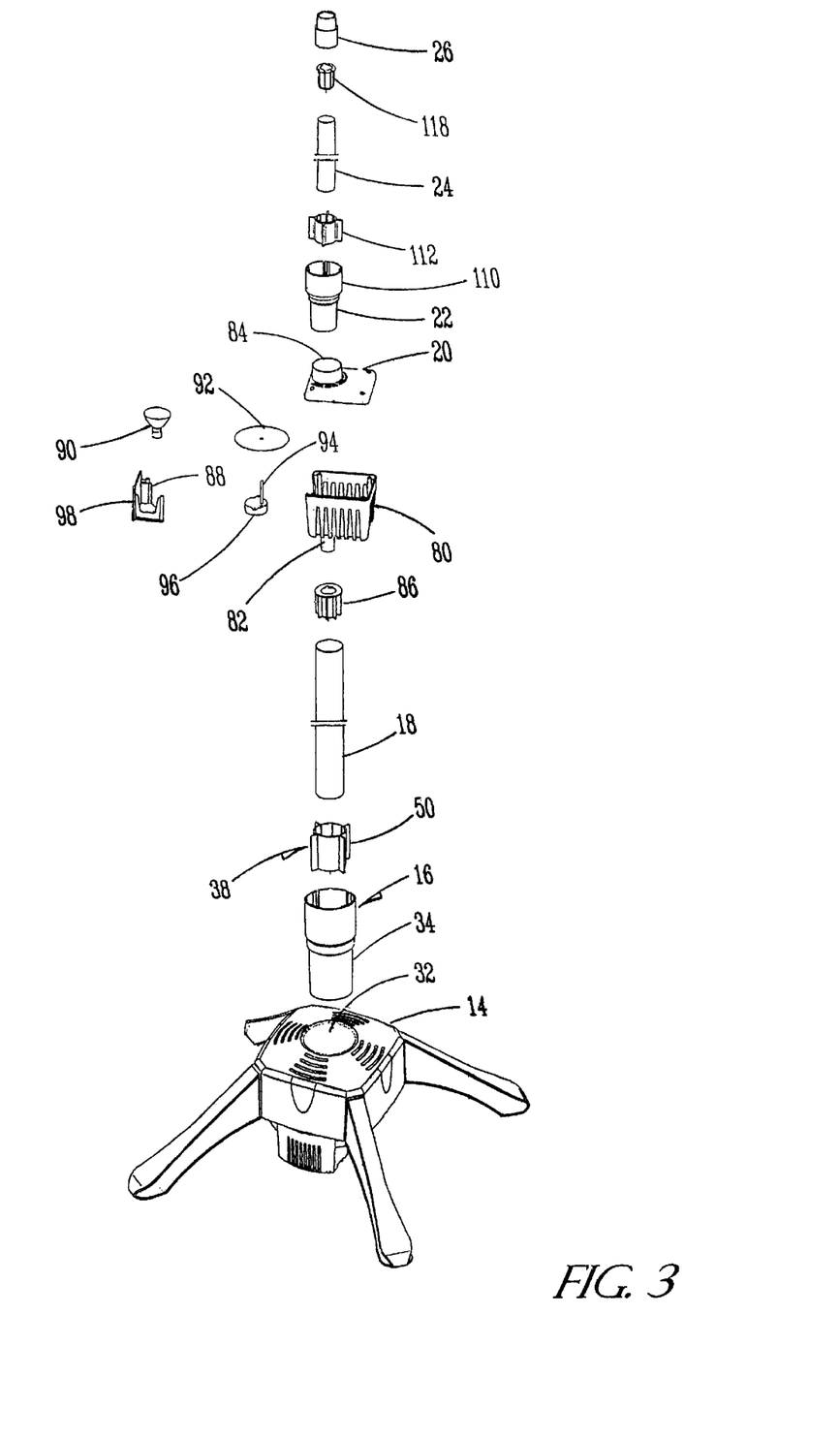
FIG. 3 is an exploded perspective view of the preferred embodiment of FIG. 2.

The construction of the stand assembly 14 is old in the art of fibre optic Christmas trees and may be of a variety of structures so long as it is able to supply light to the ends of fibre optic bundles extending through the stabilizing member 16 preferably by means of a lamp and a rotating transparent colored disk disposed in-between the lamp and the fibre optic bundles. As indicated by FIG. 3, the stand assembly 14 includes a top central opening 32 for removably receiving a bottom end 34 of the first stabilizing member 16.

Figure 4:
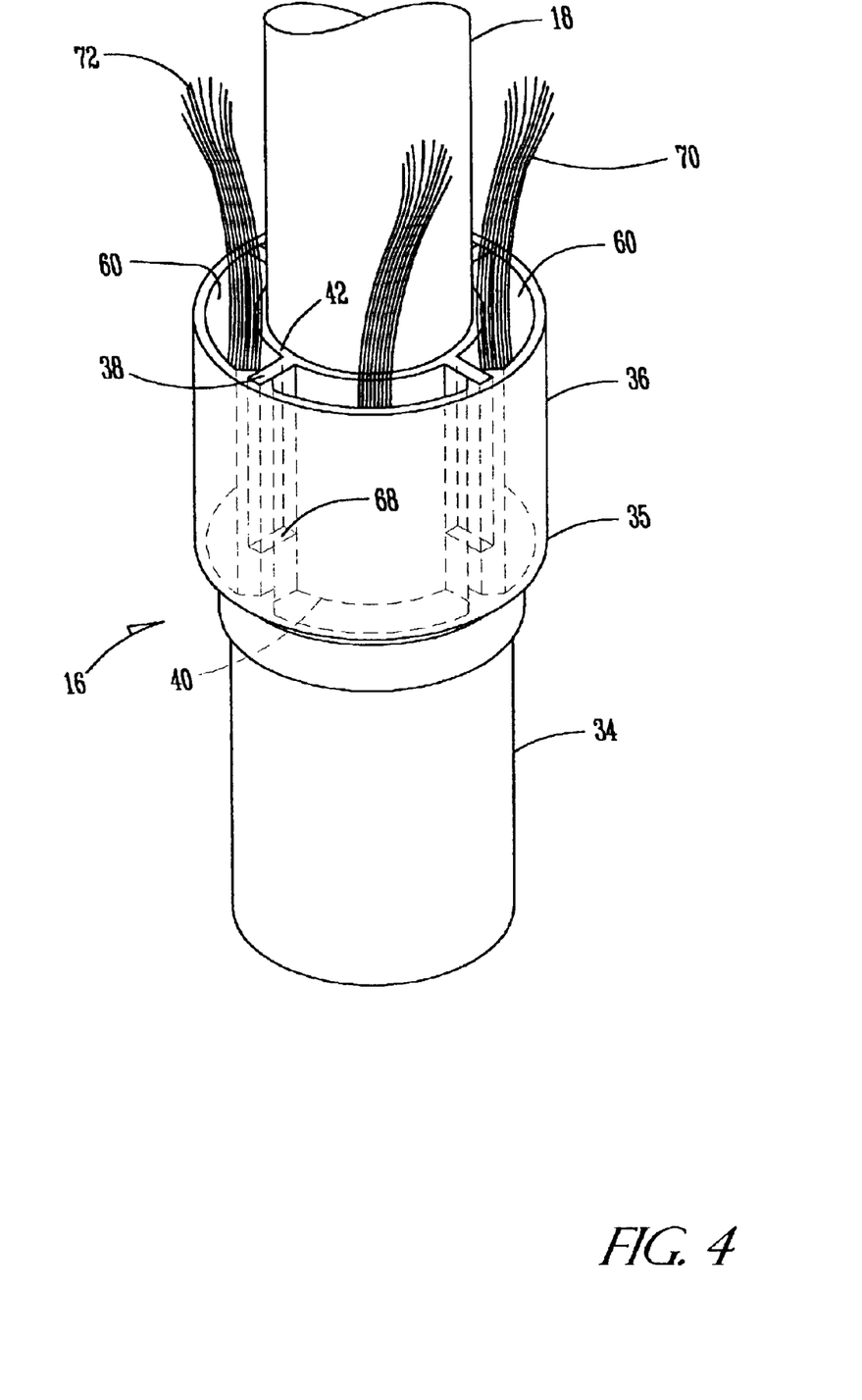
FIG. 4 is a perspective of a stabilizing member that forms part of the embodiment of FIG. 1 shown together with part of a trunk section and three fibre optic bundles.
Figure 5:
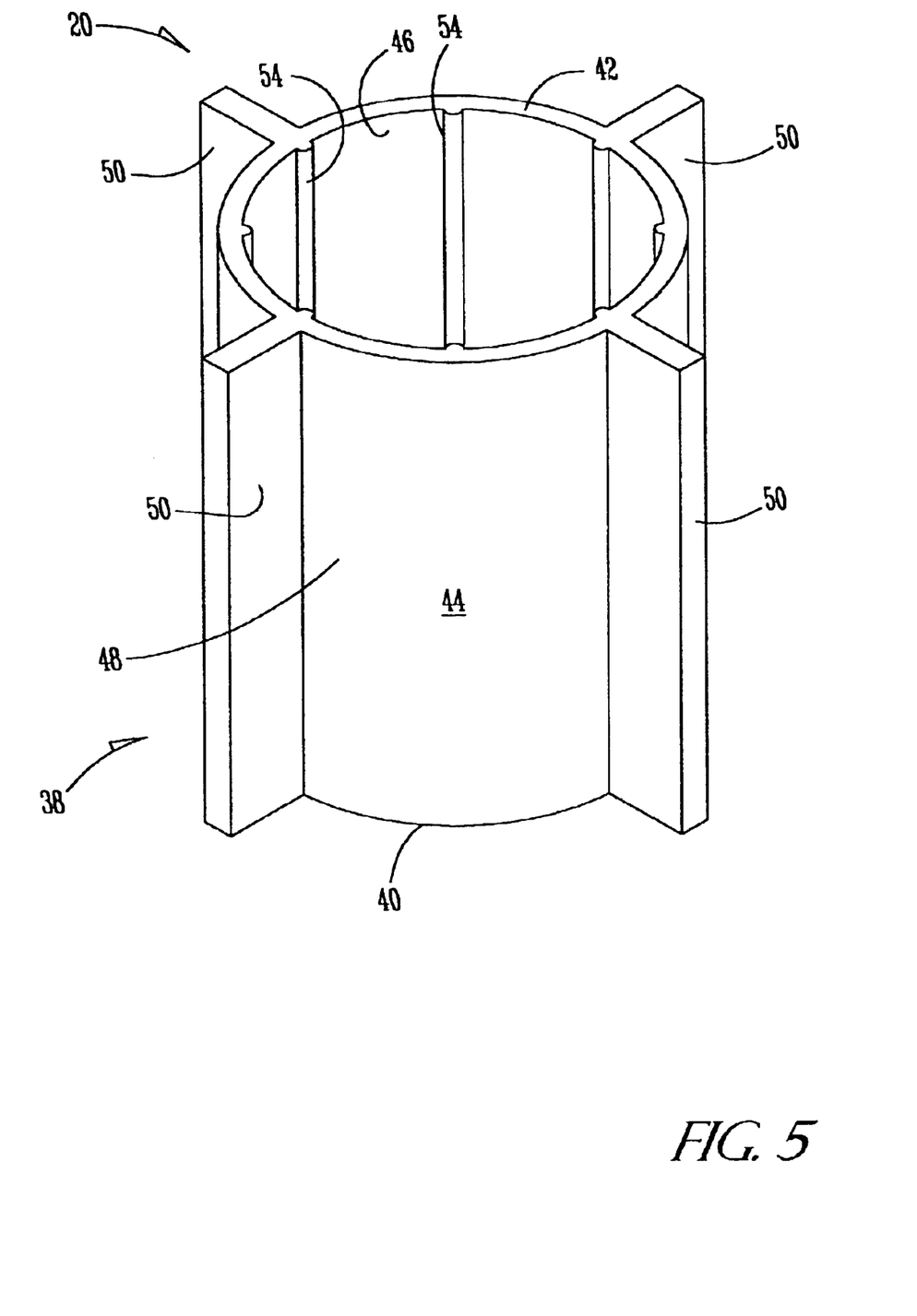
FIG. 5 is a perspective of an internal sleeve of the stabilizing member of FIG. 4.

As best shown by the perspective of FIG. 4, the first stabilizing member 16 has a main body portion 35 with an upper end 36 that is larger in diameter than that of the bottom end 34. The body portion upper end 36 is sized to accept a removable internal sleeve 38 that functions as a means to receive the first trunk section 18. The sleeve 38 preferably comprises bottom and top ends 40 and 42 respectively (see FIG. 5), a cylindrically shaped hub 44 with an inner surface 46, an outer surface 48. A plurality of wings 50 are circumferentially spaced apart along the outer surface 48 and run longitudinally thereof between said bottom and top ends 40, 42.

Figure 6:
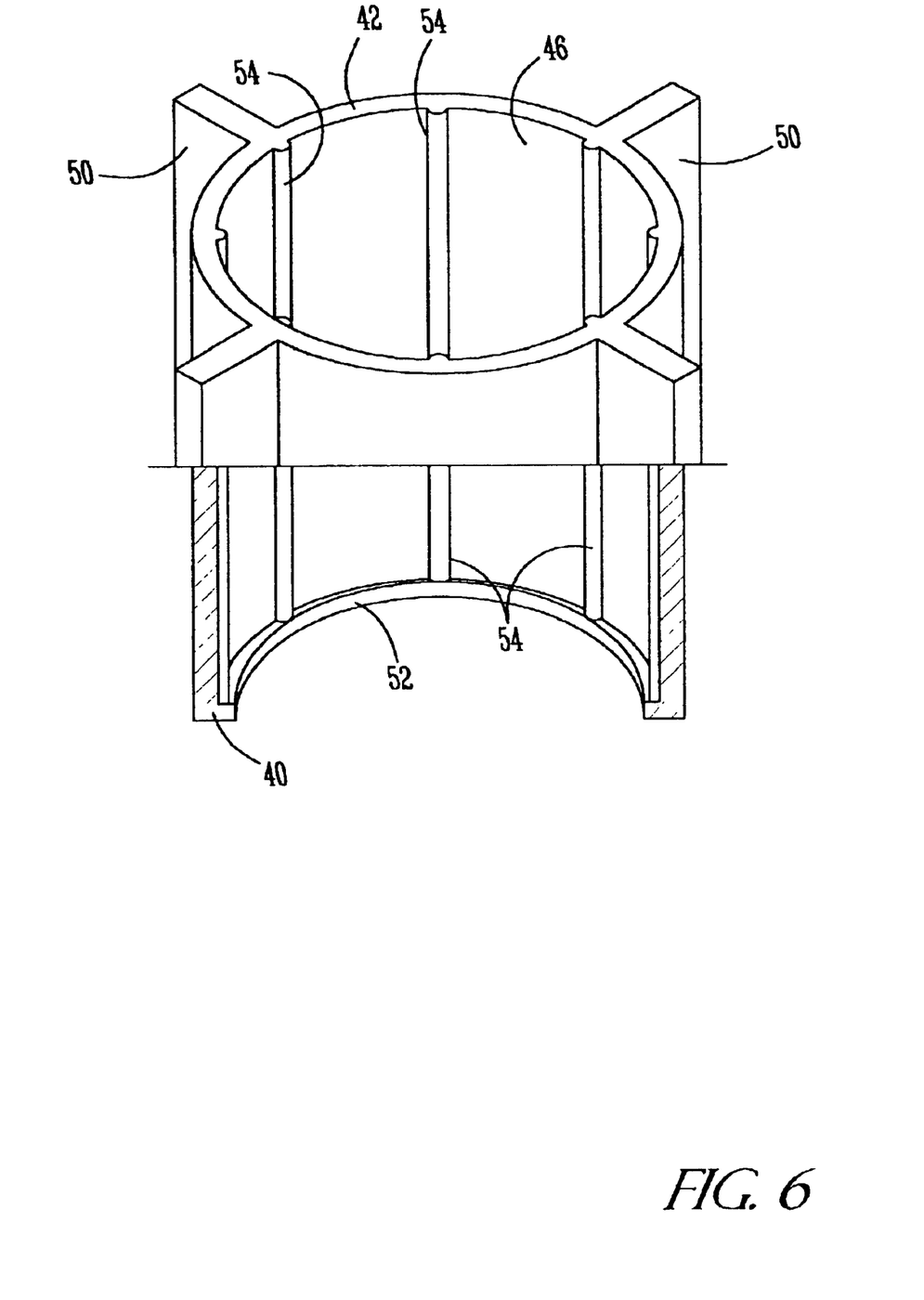
FIG. 6 is a perspective of the internal sleeve of FIG. 5 but with a cutaway portion to show inner surfaces.

As shown in FIG. 6, a lip 52 runs around the bottom end of the inner surface 46 to serve as a stop abutment for the bottom end of the trunk section 18. In the preferred embodiment, the inner surface 46 of the sleeve 38 is provided with numerous spaced apart longitudinally aligned friction strips 54. Each of the strips 54 are tapered in size from bottom to top to protrude outwardly more at the bottom than the top to increase the amount of friction they present to the trunk section 18 as it is inserted into the sleeve 38 to create a tight fit therebetween.

Figure 7:
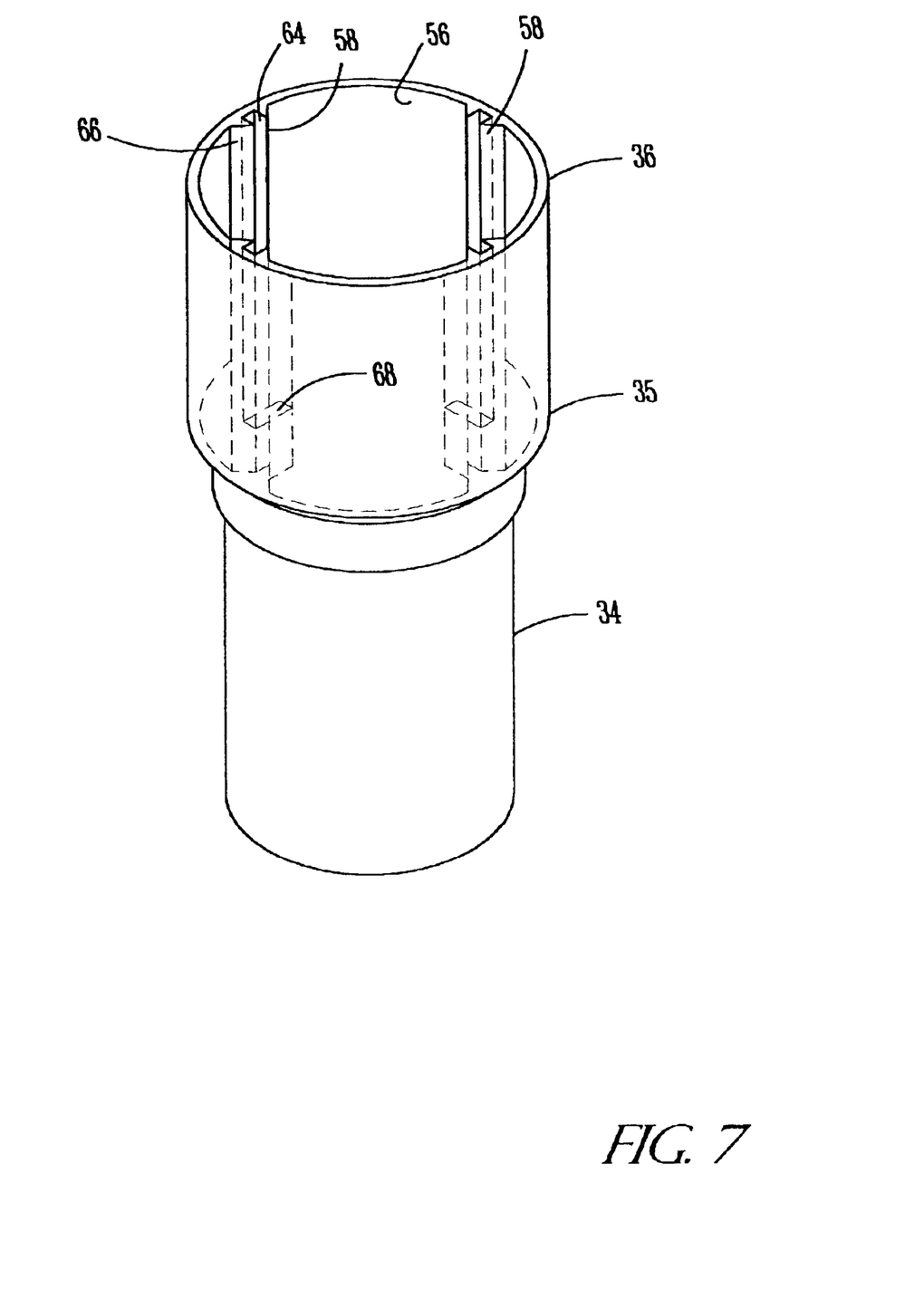
FIG. 7 is a perspective of the body section of the stabilizing member of FIG. 4.
Figure 8:
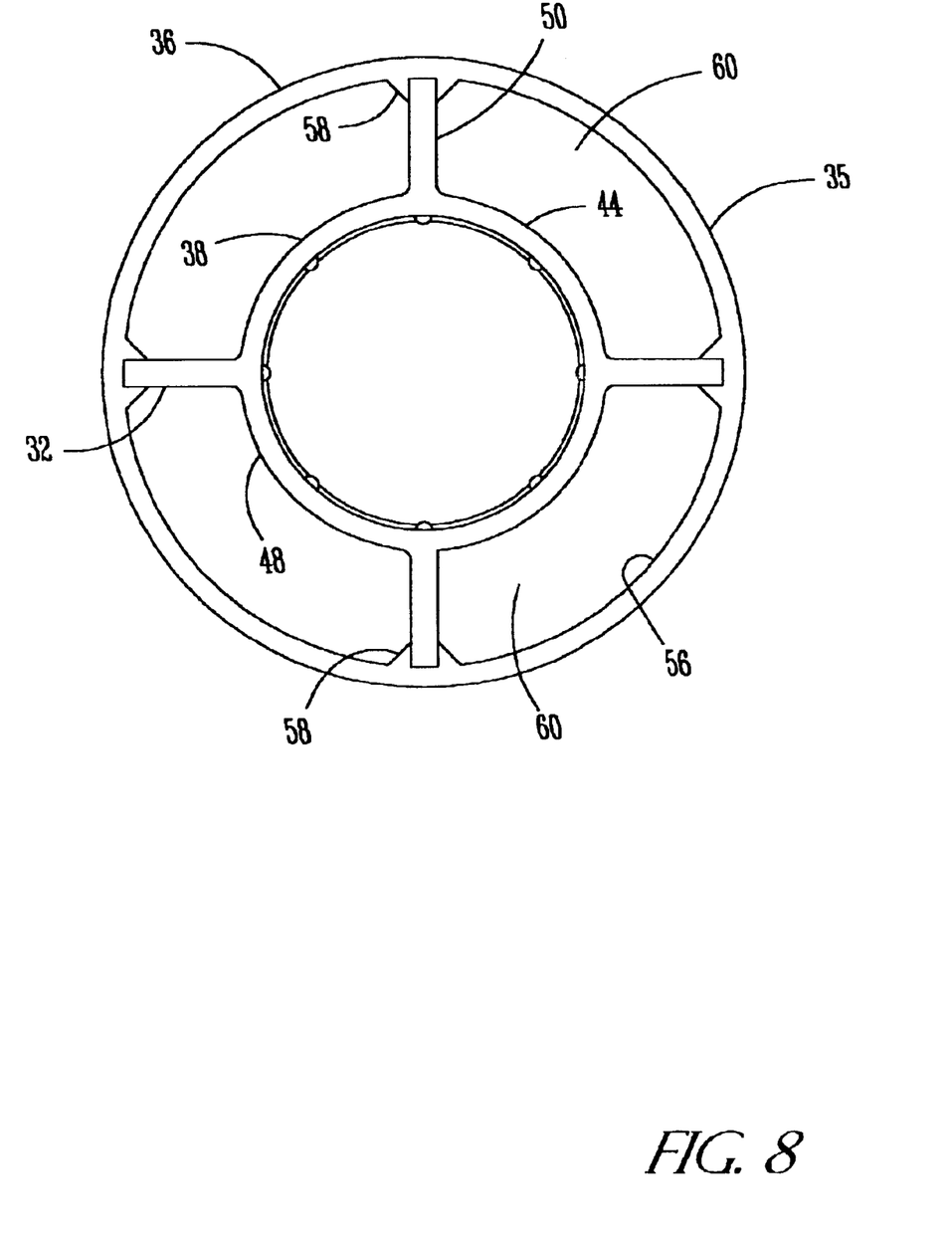
FIG. 8. is a top view of the stabilizing member of FIG. 4 with the internal sleeve of FIG. 5 inserted therein.

Referring now to FIG. 7, the upper end 36 of the main body portion 35 has an inner surface 56 with means 58 to receive each of the wings 50 for securing the internal sleeve 38 in position within the member 16. When the sleeve 38 is assembled within the body portion upper end 36, clearances 60 (as shown in FIGS. 4 and 8) are defined between the outer surface 48 of the hub 44 and the inner surface 56 of the body portion 35. The internal sleeve 38 is stabilized by the association of the wings 50 and the means 58 located on the inner surface 56 of the body portion upper end 36.

Referring to FIG. 7, preferably the means 58 to receive the wings 50 comprise channels 64 formed by closely spaced apart elongated ribs 66 into which the wings 50 slide. Each of the channels 64 is equipped with stop tab 68 at the lower edge of the channels 64 to prevent the sleeve 38 from falling out of the channels 64.

In the preferred embodiment as best indicated in FIG. 4, the stabilizing member 16 provides stability for the trunk section 18 of the lower portion of the tree 12 which is illuminated by optical fibres 70. First, the sleeve 38 is inserted into the body portion upper end 36 by sliding the wings 50 into the channels 64 until they reach the stop tabs 68. The sleeve 38 is formed such that the inside lip 52 is near the stop tabs 68 at the lower end of the channels 64. It is against this lip 52 that the bottom end of trunk section 18 will rest.

The optic fibres 70 each comprise distal ends 72 and proximal ends 74 (not shown) that extend downwardly to the bottom end of the member 16. All proximal ends 74 of the fibres 70 are located in bundles near the light source in the stand assembly 14. Each bundle of fibres 70 is then threaded through one of the clearances 60 created between the body portion inner surface 56 and the sleeve outer surface 48. The stabilizing member 16 is then secured to the stand assembly 14 such that said optic fibre proximal ends 74 are near the lamp of the stand assembly 14.

Next, the first trunk section 18 is inserted into the sleeve 38 where is it gripped tightly by the friction strips 54 until it reaches the inside lip 52 which functions as a stop abutment. Finally, above the sleeve 38, the optical fibres 70 are associated with the trunk section 18 and are directed to the branches of the lower part of the tree 12.

Preferably, the length of the trunk section 18 is sized so that it represents approximately half of the tree 12 and the optical fibres 70 associated with the trunk section 18 provide light for the lower branches of the tree 12. The upper portion of the tree 12 is lighted by means of the intermediate light source 20.

Referring again to FIGS. 2 and 3, the light source 20 has a rectangularly shaped housing 80 with a bottom mounting post 82 and an upper receptor port 84. An adaptor 86 is located in the upper end of the trunk section 18 and is sized to snuggly receive the mounting post 82 of the light source 20 to removably secure the source 20 in position. The receptor port 84 is sized to receive the lower end of the second stabilizing member 22 that is similar in construction to the member 16, but is slightly smaller in size than that of the member 16.

The light source 20 includes a lamp assembly formed of a base 88 and a lamp 90 that are located in the housing 80 during operation of the source 20 to lie beneath a transparent color wheel 92. The color wheel is mounted on an axle 94 that is driven by a motor 96 to vary the color of the light provided by the source 20. The lamp 90 and the color wheel 92 are located beneath the receptor port 84 so that light from the lamp 90 is directed outward through the port 84. The housing 80 includes a pivoting door assembly 98 on which the base 88 and the lamp 90 are mounted so that simply by opening the door assembly 98 the lamp 90 can be changed.

The stabilizing member 22 has a main body portion 110 and an internal sleeve 112 and clearances 114 for permitting optical fibres 116 (not shown) to extend between the sleeve 112 and the main body 110 just as provided by the first stabilizing member 16.

The lower end of the trunk section 24 fits into the sleeve 112 and is secured in place in a removable fashion comparable to that of the trunk section 18. An adapter 118 fits into the upper end of the trunk section 24 and is utilized for receiving the intermediated sleeve member 26 that forms the upper end of the light emitter 10. The intermediated sleeve member 26 is designed to receive and hold the top of the tree 12.

Through the use of the light source 20, light is provided to the optical fibres 116 for lighting the top and upper half of the tree 12. Thus, the tree 12 can be disassembled into separate portions in a relatively simple and efficient manner and yet the light provided to the upper and lower portions of the tree is provided directly from a light source adjacent to the optical fibres lighting each section.

Thus, the present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced otherwise and as specifically described.

What is claimed is:

1. A coaxial light emitter for a fibre optic lighted artificial tree comprising:
    (a) a stand assembly having a fibre optic light source and a receiving means;
    (b) a first trunk assembly having a bottom end secured in said receiving means;
    (c) a first set of fibre optic strands having lower ends that are in light conductive contact with the light source of said stand assembly and upper ends that are disposed on the lower portions of said tree;
    (d) an intermediate fibre optic light source assembly connected to the upper end of said first trunk assembly;
    (e) a second trunk assembly having a bottom end secured in said intermediate light source assembly; and
    (f) a second set of fibre optic strands having lower ends that are in light conductive contact with the light source of said intermediate light source and upper ends that are disposed on the upper portions of said tree.

2. A coaxial light emitter as described in claim 1, wherein said intermediate fibre optic light source consists of a lamp and a transparent color wheel for changing the color of the light that is provided to said second set of fibre optic strands.

3. A coaxial light emitter as described in claim 1, wherein said intermediate fibre optic light source includes a housing with a sidewall having a door assembly pivotally attached thereto and a top with a receptor port.

4. A coaxial light emitter as recited in claim 3, wherein said intermediate fibre optic light source assembly has a lamp that serves as the light source for said assembly and a rotating transparent color wheel for changing the color of the light provided by said lamp, which lamp is secured to the door assembly of said light source housing.

5. A coaxial light emitter as recited in claim 4, wherein said first trunk asscnibly has a length equal to at least thirty percent of the height of said tree.

6. A coaxial light emitter as described in claim 4, wherein said second trunk assembly has a length equal to at least thirty percent of the height of said tree.

7. A coaxial light emitter as described in claim 3, wherein said first trunk assembly includes a first tree stabilizing member having a bottom end secured in said stand assembly receiving means, an upper end, and a sleeve member disposed in said upper end and having a sidewall that is spaced apart from the sidewall of said upper end to provide clearances therebetween and said first set of fibre optic strands are positioned through the clearances of said first stabilizing member.

8. A coaxial light emitter as described in claim 7, wherein said second trunk assembly includes a second tree stabilizing member having a bottom end secured in said intermediate light source housing receptor port, an upper end, and a sleeve member disposed in said upper end and having a sidewall that is spaced apart from the sidewall of said upper end to provide clearances therebetween and said second set of fibre optic strands are positioned through the clearances of said second stabilizing member.

9. A coaxial light emitter as described in claim 8, wherein said second trunk assembly further includes a sleeve assembly at its upper end for assisting in the support of the upper portion of said tree.

10. A coaxial light emitter for a fibre optic lighted artificial tree comprising:

(a) a stand assembly having a fibre optic light source and a receiving means;

(b) first tree stabilizing member having a bottom end secured in said stand assembly receiving means, an upper end and a sleeve member disposed in said upper end and having a sidewall that is spaced apart from the sidewall of said upper portion to provide clearances therebetween, (c) a first set of fibre optic strands having lower ends that are positioned through the clearances of said first tree stabilizing, member to extend into light conductive contact with the light source of said stand assembly and upper ends that can be disposed on the lower portions of said tree;

(d) a first trunk member having an upper end and a bottom end that is member having a length equal to at least thirty percent of the height of said tree;

(e) an intermediate fibre optic light source assembly having lower connecting means for connecting to said upper end of said trunk member, and an upper receiving means;

(f) a second tree stabilizing member having a bottom end secured in said receiving means of said intermediate light source, an upper end, and a sleeve member disposed in said upper end and having a sidewall that is spaced apart from the sidewall of said upper portion to provide clearances therebetween;

(g) a second set of fibre optic strands having lower ends that are positioned through the clearances of said second stabilizing member to extend into light conductive contact with the light source of said intermediate light source and upper ends that can be disposed on the upper portions of said tree;

(h) a second trunk member having an upper end and a bottom end that is secured in said sleeve member of said second stabilizing member, said trunk member having a length equal to at least thirty percent of the height of said tree, and (i) assembly mounted on the upper end of said second trunk for assisting in the support of the upper portion of said tree.

\* \* \* \* \*